United States Patent [19]

Okuno et al.

[11] Patent Number: 5,734,912
[45] Date of Patent: Mar. 31, 1998

[54] POWER CONTROL APPARATUS FOR INPUT/OUTPUT SUBSYSTEM

[75] Inventors: Masamichi Okuno; Katsuhiko Shioya, both of Kawasaki, Japan

[73] Assignee: Fujitsu Limited, Kawasaki, Japan

[21] Appl. No.: 274,712

[22] Filed: Jul. 18, 1994

[30] Foreign Application Priority Data

Sep. 28, 1993 [JP] Japan ................................. 5-240927

[51] Int. Cl.$^6$ .......................................... G11B 19/00
[52] U.S. Cl. .................................. 395/750; 395/441
[58] Field of Search ........................... 395/750, 441, 395/493, 821, 848; 365/227

[56] References Cited

U.S. PATENT DOCUMENTS 5,345,347  9/1994  Hopkins et al. ........................ 360/71
5,423,046  6/1995  Nunnelley et al. .................... 395/750

Primary Examiner—Jack B. Harvey
Assistant Examiner—Jeffrey K. Seto
Attorney, Agent, or Firm—Staas & Halsey

[57] ABSTRACT

Rush current is dispersed with a power control section having a simple construction, irrespective of the number of disk units. A plurality of disk modules each having a built-in power section and a built-in disk drive are grouped and housed in a single disk unit. A plurality of disk units are provided in response to the system scale. An input/output control section is provided in a disk unit, and performs control of data input/output to and from the plurality of disk modules in the same unit and issuance, upon power-on, of a power-on instruction in compliance with a predetermined procedure. There is provided a first power control section common to all the disk units for instructing power-on in a lump. A second power control section is provided for each disk module of a disk unit, and instructs power-on to the power section and the disk drive within the module upon receipt of both a power-on instructing signal from the input/output control section in the same unit and another power-on instructing signal from the external first power control section.

9 Claims, 5 Drawing Sheets

5,734,912

POWER CONTROL APPARATUS FOR INPUT/OUTPUT SUBSYSTEM

BACKGROUND OF THE INVENTION

The present invention relates to a power control apparatus for an input/output subsystem used for external storage of a computer. More particularly, the present invention relates to a power control apparatus for an input/output subsystem comprising a power unit and one or more input/output units.

An input/output subsystem serving as an external storage unit of a computer comprises one or more input/output units provided under the command of a power unit. A plurality of input/output modules are provided in an input/output unit. A power section and an input/output device having a storage medium are provided in an input/output module. In such an input/output subsystem, it is necessary to perform sequence control by the power unit so as to cause dispersion of rush current flowing into the plurality of input/output units upon power-on.

FIG. 1 illustrates power control in a conventional input/output subsystem. The input/output subsystem comprises disk units 300-1 to 300-n. As shown by the disk unit 300-1, m magnetic disk modules 204-11 to 204-1m are connected under an input/output control section 202-1. Each of the magnetic disk modules 204-11 to 204-1m has built-in power sections 206-11 to 206-1m and built-in disk drives 208-11 to 208-1m. In an external power control section 200, a power-on control sequence is provided for each of the disk units 300-1 to 300-n. More specifically, power control lines 210-11 to 210-nm are drawn out from the power control section 200 for each of the disk units 300-1 to 300-n, and issue a power-on instructing signal sequentially to the disk units 300-1 to 300-n upon power-on to ensure dispersion of rush current occurring upon power-on.

Since the magnetic disk modules 204-11 to 204-nm have spindle motors which cause a large rush current in the disk drives 208-11 to 208-nm, motors are not started for the disk drives 208-11 to 208-nm in response to a power-on instruction from the power control section 200 to each of the magnetic disk modules 300-1 to 300-n, but power-on of only the power sections 206-11 to 206-nm is performed in a group for each unit. Thereafter, the input/output control sections 202-1 to 202-n issue a motor starting instruction for each unit sequentially to the disk drives 208-11 to 208-nm, thus dispersing the current increment occurring upon starting the motors.

The number of disk units 300-1 to 300-n of the input/output subsystem is variable, depending on the system capacity. For the purpose of sequence control of power-on to be conducted by the power control section 200, it is necessary to anticipate maximum capacity and make preparations accordingly. However, when the number of the mounted disk units is less-than maximum capacity, a circuit portion remains unused in the power control section 200, resulting in excessive cost.

SUMMARY OF THE INVENTION

According to the present invention, there is provided a power control apparatus for an input/output subsystem, which permits reduction of rush current upon rise-up, without being affected by the number of installed input/output units.

The input/output module used in the present invention has a built-in power section and disk drives, for example, as input/output devices. A single input/output unit is composed of a plurality of input/output modules. An input/output control section for controlling input and output of data to and from the individual input/output modules is provided in this input/output unit. Upon power-on, furthermore, the input/output control section issues a power-on instructing signal to the input/output modules within the unit to which it belongs in compliance with a predetermined procedure. A first power control section which issues a power-on instructing signal in a lump to the individual input/output modules of all the input/output units when power-on is provided as a common section. In addition, a second power control section is provided for each input/output module of the input/output unit. When receiving both a power-on instructing signal from the input/output control section of its own unit and a power-on instructing signal from the first power control section, the second power control section of the input/output module instructs a power-on operation to the power section and the input/output device.

In the present invention, it is possible to increase or reduce the component configuration for each group comprising an input/output control section and a plurality of input/output modules, i.e., for each input/output unit. The input/output control section issues a power-on instructing signal sequentially to the plurality of input/output modules within its own unit so that rush current upon power-on does not exceed a prescribed value. When the input/output control section of the input/output unit detects a problem (a hardware error) of any input/output module within its own unit during operation, disconnection of power is instructed to that input/output module suffering from the detected problem. Reliability is further ensured by achievement of a double-circuit configuration of the input/output control section of the input/output unit.

According to the power control apparatus of the present invention as described above, the first power control section has only to issue a power-on instruction in a lump, irrespective of the system configuration, without being conscious of the number of the input/output units comprising the subsystem, and does not require sequence control, thus making it possible to build a simple circuit configuration.

The second power control section of the input/output unit does not perform power-on of the built-in power section and the built-in input/output module within the same unit when receiving a power control signal issued in a lump from the first power control section. After issuance of a power-on instructing signal by the first power control section, the second power control section conducts power-on operation of the built-in power section only upon receipt of a power-on instructing signal (input/output device starting signal) from the input/output control section, and starts the motor of the input/output device. It is needless to mention that a power-on instruction from the input/output control section covers sequence control instructing power-on in a prescribed sequence with a view to dispersing current increment occurring upon starting. This integrates power-on sequence control into a single channel on the input/output control section provided as a common section for the plurality of input/output modules in the input/output unit. Because power-on is effectively accomplished upon instruction from the input/output control section, when an input/output module shutdown by a problem during operation is recognized, the power of the troubled module can be disconnected by an instruction from the input/output control section alone, thus making it possible to reduce power consumption.

The above and other objects, features, and advantages of the present invention will become more apparent from the following detailed description with reference to the drawings.

DETAILED DESCRIPTION OF THE PREFERRED EMBODIMENTS

Figure 1:
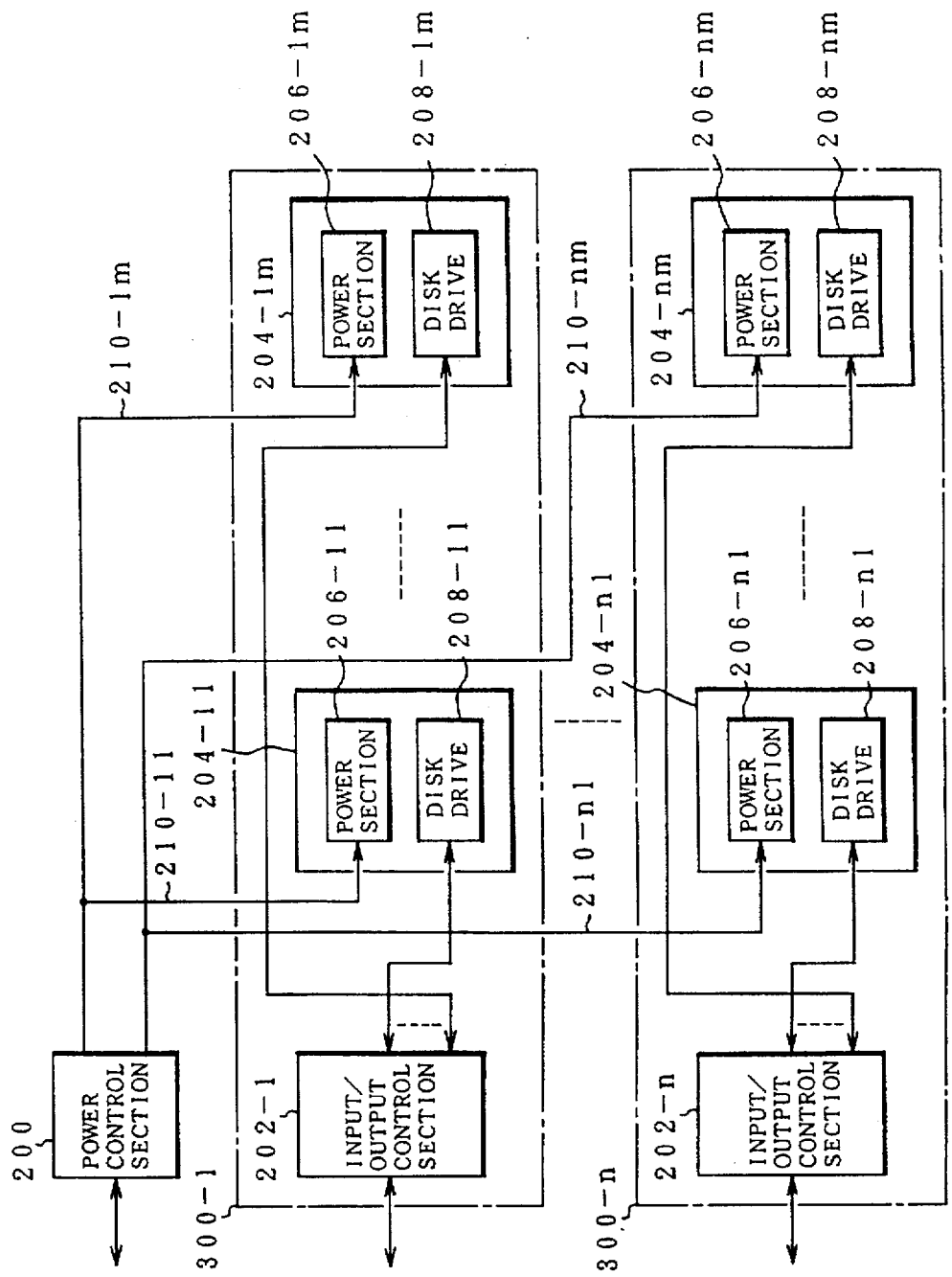
FIG. 1 is a block diagram a conventional unit.
Figure 2:
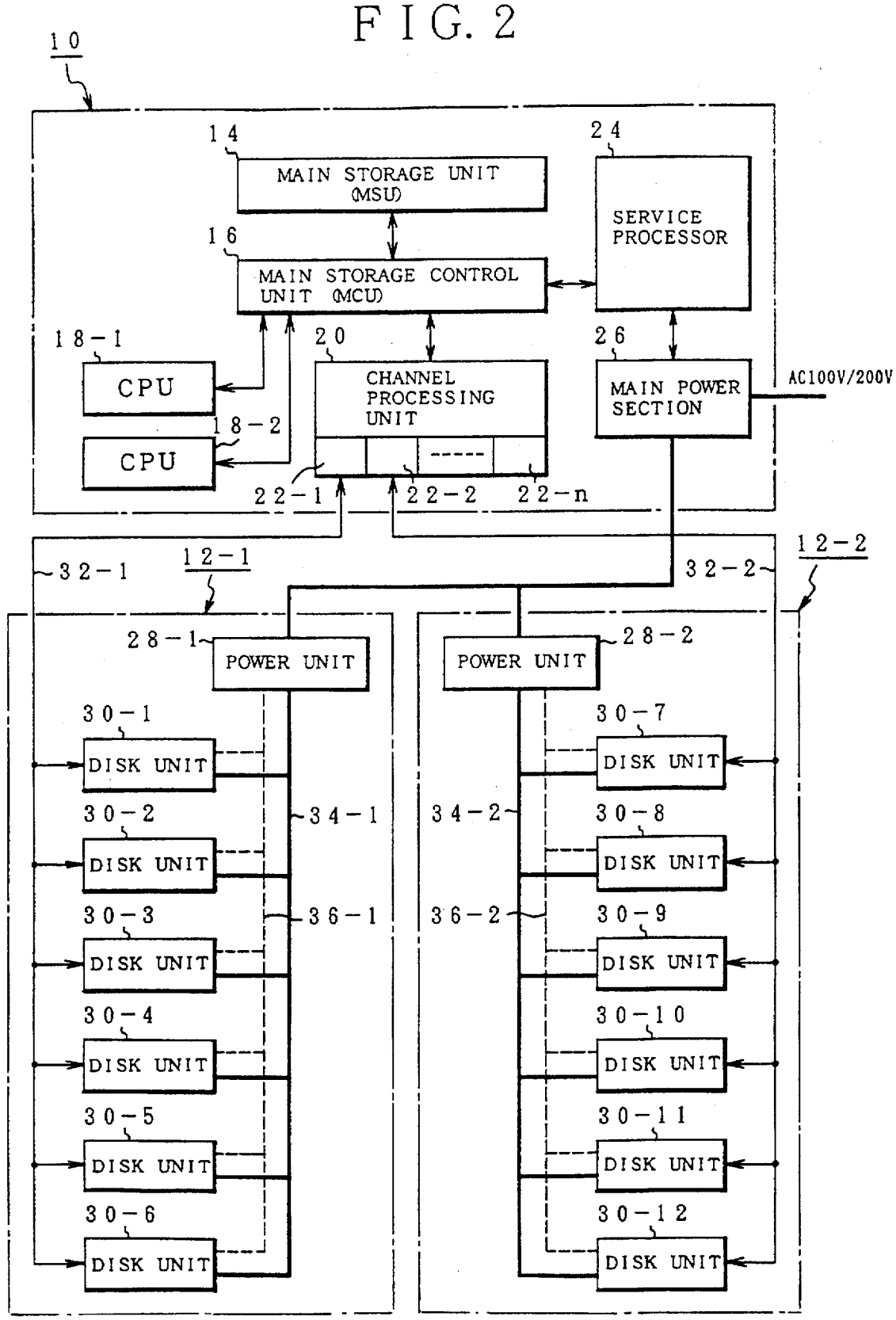
FIG. 2 is a block diagram of a computer system to which the present invention is applicable.

FIG. 2 illustrates a computer system to which the present invention is applicable. The computer system comprises a mainframe 10 and, for example, two input/output subsystems 12-1 and 12-2. A main storage unit 14 and a main storage control unit 16 are provided in the mainframe 10. The main storage control unit 16 is of a multiple-CPU configuration provided with two CPUs 18-1 and 18-2 in this embodiment. The main storage control unit 16 is provided also with a channel processing unit 20. The channel processing unit 20 has a plurality of channels 22-1 to 22-n. The input/output subsystem 12-1 is connected to the channel 22-1, and the input/output subsystem 12-2 is connected to the channel 22-2. In addition, a service processor 24 is provided in the mainframe 10 and takes charge of starting and stopping the mainframe 10 and the input/output subsystems 12-1 and 12-2, and maintains processing against errors. A main power section 26 is provided in the mainframe 10 to supply AC 100 V or AC 200 V to the input/output subsystems 12-1 and 12-2 under the control through instruction of the service processor 24. Taking up the input/output subsystem 12-1 as an example from among the input/output subsystems 12-1 and 12-2, it has a power unit 28-1 provided as a common section, and disk units 30-1 to 30-6. In this embodiment, both the input/output subsystems 12-1 and 12-2 are in their maximum configuration, in which up to six disk units 30-1 to 30-6 and 30-7 to 30-12 can be mounted. The number of disk units may be freely selected within a range from one to six, depending upon the system capacity.

Regarding input/output subsystem 12-1, an interface 32-1 from the channel 22-1 of the channel unit 20 is connected to the disk units 30-1 to 30-6, to conduct data input and output, issuance of a command, and exchange of status. A common power line 34-1 is drawn from the power unit 28-1 to the disk units 30-1 to 30-6. The power unit 28-1, which receives AC 100 V or AC 200 V from the mainframe 10, converts it into DC 29 V, and supplies it through the power line 34-1 to the disk units 30-1 to 30-6. A power control line 36-1 is drawn from the power unit 28-1 to each of the disk units 30-1 to 30-6. Upon receipt of a power-on instruction from the mainframe 10, in the present invention, the power unit 28-1 issues a power-on instructing signal in a group to all the disk units 30-1 to 30-6. The input/output subsystem 12-2 has the same configuration as that of the input/output subsystem 12-1 as described above: the input/output subsystem 12-2 has a power unit 28-2 and six disk units 30-7 to 30-12.

Figure 3:
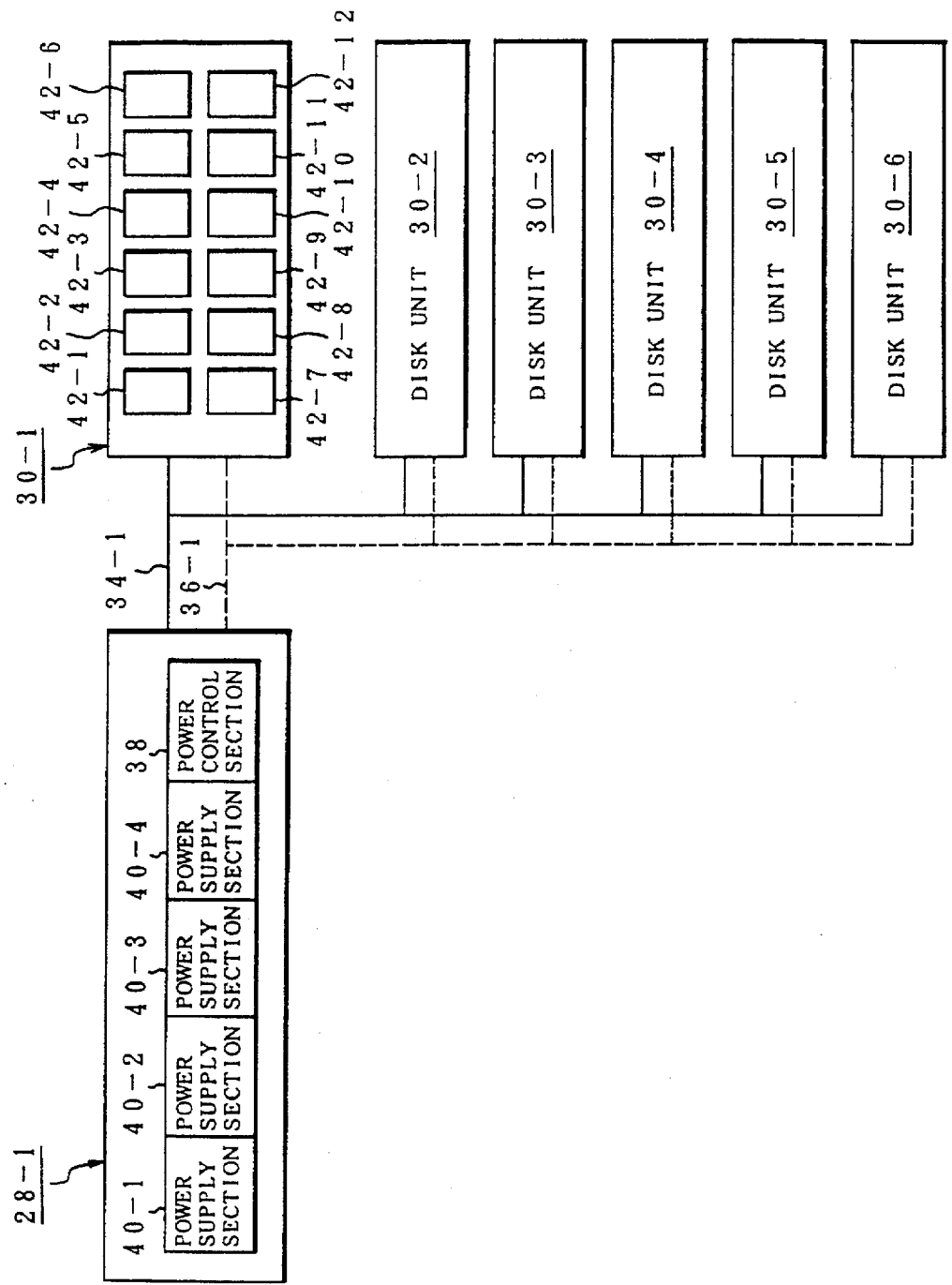
FIG. 3 is a block diagram of an input/output subsystem of FIG. 2.

FIG. 3 illustrates the subsystem 12-1 as taken from FIG. 2. A power control section 38 and four power supply sections 40-1 to 40-4 are provided in the power unit 28-1 provided as a common section. As typically represented by the disk unit 30-1, the disk units 30-1 to 30-6 are provided with, for example, 12 magnetic disk modules 42-1 to 42-12.

In the maximum configuration mounting the six disk units 30-1 to 30-6, therefore, 72 magnetic disk modules would be installed. The power supply section 38 provided in the power unit 28-1 has functions as a first power control unit, and issues a power-on instructing signal through the power control line 36-1 to all the disk units 30-1 to 30-6 upon power-on. In the maximum capacity mounting six disk units 30-1 to 30-6, the power unit 28-1 is provided with four power supply sections 40-1 to 40-4. The manner of power supply in this case is that output of the four power supply sections 40-1 to 40-4 is dot-ORed to supply power to the disk units 30-1 to 30-6 so that the total power required by the disk units 30-1 to 30-6 can be accommodated by three of the four power supply sections 40-1 to 40-4. Another conceivable manner of power supply consists of allocating the power supply section 40-1 to the disk units 30-1 and 30-2, allocating the power supply section 40-2 to the disk units 30-3 and 30-4, allocating the power supply section 40-3 to the disk units 30-5 and 30-6, and allocating the power supply section 40-4 to the disk units 30-1 to 30-6 for backup.

Figure 4:
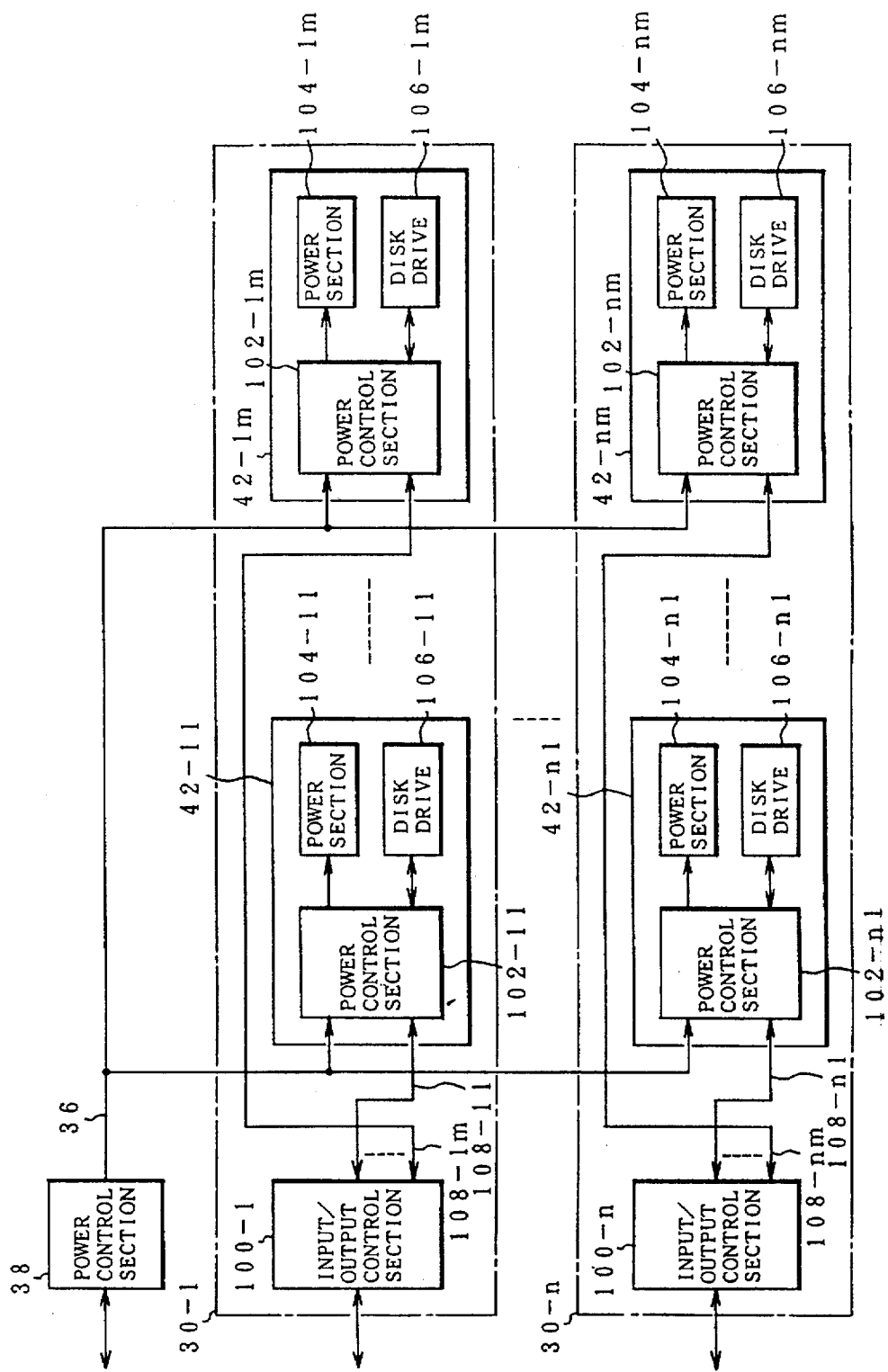
FIG. 4 is a block diagram of details of the input/output unit of the present invention.

FIG. 4 illustrates a first embodiment of the power control apparatus of the present invention. In FIG. 4, n denotes the number of disk units, and m, the number of disk drives provided for each disk unit. Each of the disk units 30-1 to 30-n constitutes an expansion unit. Taking up the disk unit 30-1 as an example, m magnetic disk modules 42-11 to 42-1m are provided for a single input/output control section 100-1. From among the magnetic disk modules 42-11 to 42-1m, the magnetic disk module 42-11, taken up as an example, is provided with a power control section 102-11 serving as a second power control units, a power section 104-11, and a disk drive 106-11. The disk drive 106-11 rotates a 3.5-inch disk medium, for example, by a spindle motor, and performs read and write of data while positioning the head by a voice coil motor. A power control line 36 from the power control section 38 as the first power control unit is connected to the power control section 102-11, and furthermore, a drive bus 108-11 from the input/output control section 100-1 of the same unit is connected thereto. The same applies also to the other magnetic disk modules 42-12 to 42-nm.

In the input/output control section 100-1, there is previously set a sequence control procedure for performing sequentially power-on and drive starting for the disk drives 42-11 to 42-1m belonging to the same disk unit 30-1. This sequence control procedure is set forth so that rush current of the disk units upon power-on and drive starting does not exceed a predetermined normal current. It is needless to mention that the sequence control procedure of power-on by the input/output control section 100-1 may instruct power-on of one by one of the magnetic disk modules 42-11 to 42-1m, or instruct power-on of a few modules at a time so far as rush current thereupon is within the prescribed range.

The configuration and functions of the disk unit 30-1 are the same also for the remaining disk units 30-2 to 30-n. The power control section 38 as the first power control unit issues a power-on instructing signal to the power control line 36 upon power-on, and this power control line 36 is in turn commonly connected to all the magnetic disk modules 42-11 to 42-nm. Therefore, the power control section 38 is not required to be conscious of the number of disk units and the number of magnetic disk modules mounted on the input/output subsystem, but has only to make crossover connection of the power control line 36 corresponding to the number of the installed magnetic disk modules.

Now, the operation of the embodiment shown in FIG. 4 is described. When a power-on instruction from the service processor 24 provided on the mainframe 10, for example, is given to the power control section 38, a power-on instructing signal is issued to the power control line 36 Accordingly, the power-on instructing signal from the power control section 38 is given to the power control sections 102-11 to 102-nm provided in all the magnetic disk modules 42-11 to 42-mn. With this alone, however, a power-on instruction is not made to the power sections 104-11 to 104-nm and the disk drives 106-11 to 106-nm. After issuance of the power-on instruction by the power control section 38, system starting commands are sent in a group, for example, from such software as the input/output management program running on the mainframe, to the input/output control sections 100-1 to 100-n. Upon receipt of this system starting command from a higher-level device, each of the input/output control sections 100-1 to 100-n issues an input/output starting instruction sequentially to the magnetic disk modules 42-1 to 42-1m, . . . , 42-n1 to 42-nm installed under the control thereof in accordance with a previously prepared sequence control procedure. The control sections 102-11 to 102-nm having received the input/output starting instruction perform power-on instruction to the power sections 104-11 to 104-nm and device starting instruction to the disk drives 106-11 to 106-nm having a motor, on condition that a power-on instructing signal has already been received by the power control line 36 from the power control section 38.

As the power supply sections 40-1 to 40-4 are allocated to the power unit 28-1 for the individual disk units, rush current can be inhibited within a prescribed range of values capable of coping with the power capacity even upon parallel power-on for the disk units 30-1 to 30-n. When an unrecoverable problem such as a hardware error in any of the magnetic disk modules 42-11 to 42-1m contained in the disk unit 30-1, for example, it is possible to isolate the troubled module by disconnecting power in compliance with an instruction from the input/output control section 100-1. More specifically, the input/output control section 100-1 issues a status requesting command at prescribed time intervals to the magnetic disk modules 42-11 to 42-1m in an empty state not allowing access from a higher-level device. When an unrecoverable problem status response is received from the troubled magnetic disk module, the input/output control section 100-1 issues a power disconnecting instruction to the troubled module through the device bus, turns off the power section, and stops the disk drive. As a result, it is possible to disconnect unnecessary power supply to the troubled magnetic disk module, and thus to reduce power consumption. It is also possible in this manner to prevent the problem from propagating, which may be caused by continuing power supply without solving the problem. Occurrence of the problem in the magnetic disk module is of course notified to the higher-level service processor, and when the troubled magnetic disk module is replaced by a maintenance man, resumption of power-on based on a trouble recovering instruction from a higher-level device makes the module operable again.

Figure 5:
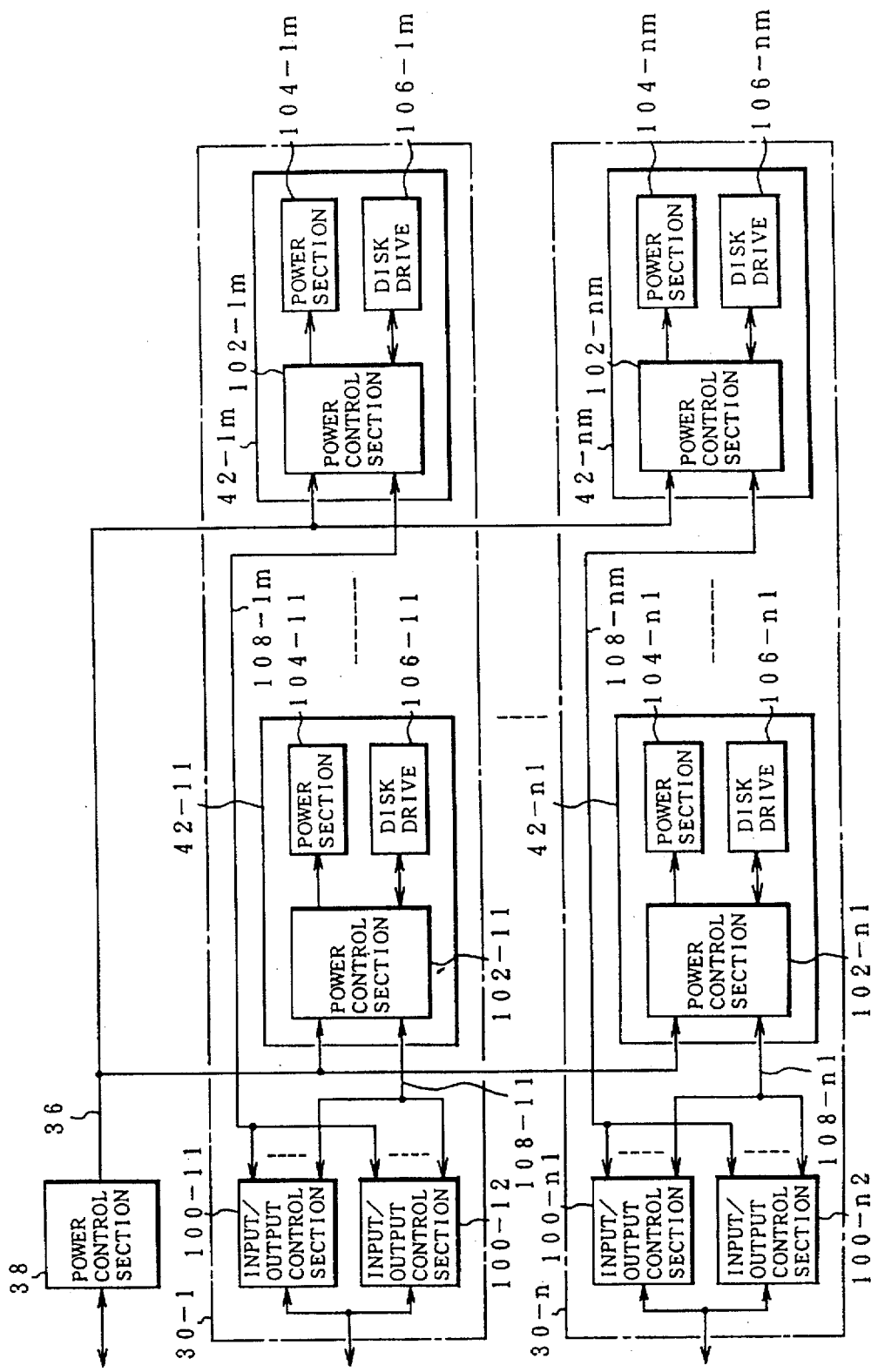
FIG. 5 is a block diagram of another embodiment of the present invention.

FIG. 5 illustrates a second embodiment of the present invention. This embodiment is characterized in that the input/output control section provided in each of the disk units 30-1 to 30-n is realized in the form of double circuits. More specifically, pairs of input-output control sections 100-11 and 100-12, . . . , 100-n1 and 100-n2 are respectively provided in the individual disk units 30-1 to 30-n. In the disk unit 30-1, for example, two input/output control sections 100-11 and 100-12 have identical circuit configurations to which an interface bus from a higher-level device is branch-connected. Outputs of the input/output control sections 100-11 and 100-12 to the device side are commonly connected to device buses 108-11 to 108-1m by an OR-connection, and connected to the magnetic disk modules 42-11 to 42-1m under the control thereof, as in the embodiment shown in FIG. 4. By providing two input/output control sections in double circuits in each of the disk units 30-1 to 30-n, it is possible, even upon stoppage of functions of any of the input/output control sections by a problem, to continue operation with the remaining input/output control section in normal operation, thus largely improving reliability of the input/output subsystem.

While the above-mentioned embodiments have covered the case of the maximum configuration with six disk units, it suffices to increase or decrease only the number of disk units for any of the minimum and the maximum configurations.

Magnetic disk modules have been used as input/output modules in the above embodiments, but it is needless to mention that any other appropriate input/output modules such as photomagnetic disk modules and semiconductor memory modules may be used in the present invention. The present invention is not limited to any of the numerical values shown in the embodiments.

What is claimed is:

1. A power control apparatus for an input/output subsystem, which comprises:

a plurality of input/output modules each having a built-in power section and a built-in input/output device for reading and writing data from and into a storage medium;

an input/output unit formed by incorporating said plurality of input/output modules;

an input/output control section which is provided in said input/output unit, issues a power-on instructing signal to each of said plurality of input/output modules in accordance with one of a predetermined procedure after manual power-on, and when a system power-on instruction is received from a host, and controls data input and output to and from the input/output device of each of said input/output modules after said system power-on;

a first power control section which issues power-on instructing signals to said plurality of input/output modules when a system power-on instruction is received from the host; and a second power control section which is provided in each of said input/output modules, instructs a power-on operation to said power section and said input/output device upon receipt of both said power-on instructing signal from said input/output control section and said power-on instructing signal from said first power control section.

2. A power control apparatus according to claim 1, wherein:

a plurality of said input/output units are provided for said first power control section.

3. A power control apparatus according to claim 2, wherein:

the number of said input/output units can be increased or decreased with a unit as an entity.

4. A power control apparatus according to claim 1, wherein:

said input/output control section issues a power-on instructing signal sequentially to the plurality of input/output modules in said input/output unit so that rush current upon power-on does not exceed a prescribed value.

5. A power control apparatus according to claim 1, wherein:

said input/output control section instructs, upon detection of a trouble in any of said input/output modules, disconnection of power to said troubled input/output module.

6. A power control apparatus according to claim 1, wherein:

said input/output control section is provided in the form of double circuits.

7. A power control apparatus according to claim 1, wherein:

said input/output modules are magnetic disk modules each having a built-in power section and a built-in disk drive.

8. A power control apparatus, comprising:

a second power control section connected with both a power section and a storage medium;

a first power control section connected with and providing a first signal to the second power control section; and an input/output control section connected with and providing a second signal to the second power control section;

wherein the second power control section provides a third signal to the power section upon receiving both the first and second signals.

9. A power control method, comprising:

connecting a second power control section with both a power section and a storage medium;

providing a signal from the second power control section to the power section once the second power control section receives both a signal from a first power control section and a signal from an input/output control section.

* * * * *